Dec. 28, 1965  G. C. ROINESTAD  3,225,902
BELT CONTROL
Filed Jan. 17, 1963  3 Sheets-Sheet 1
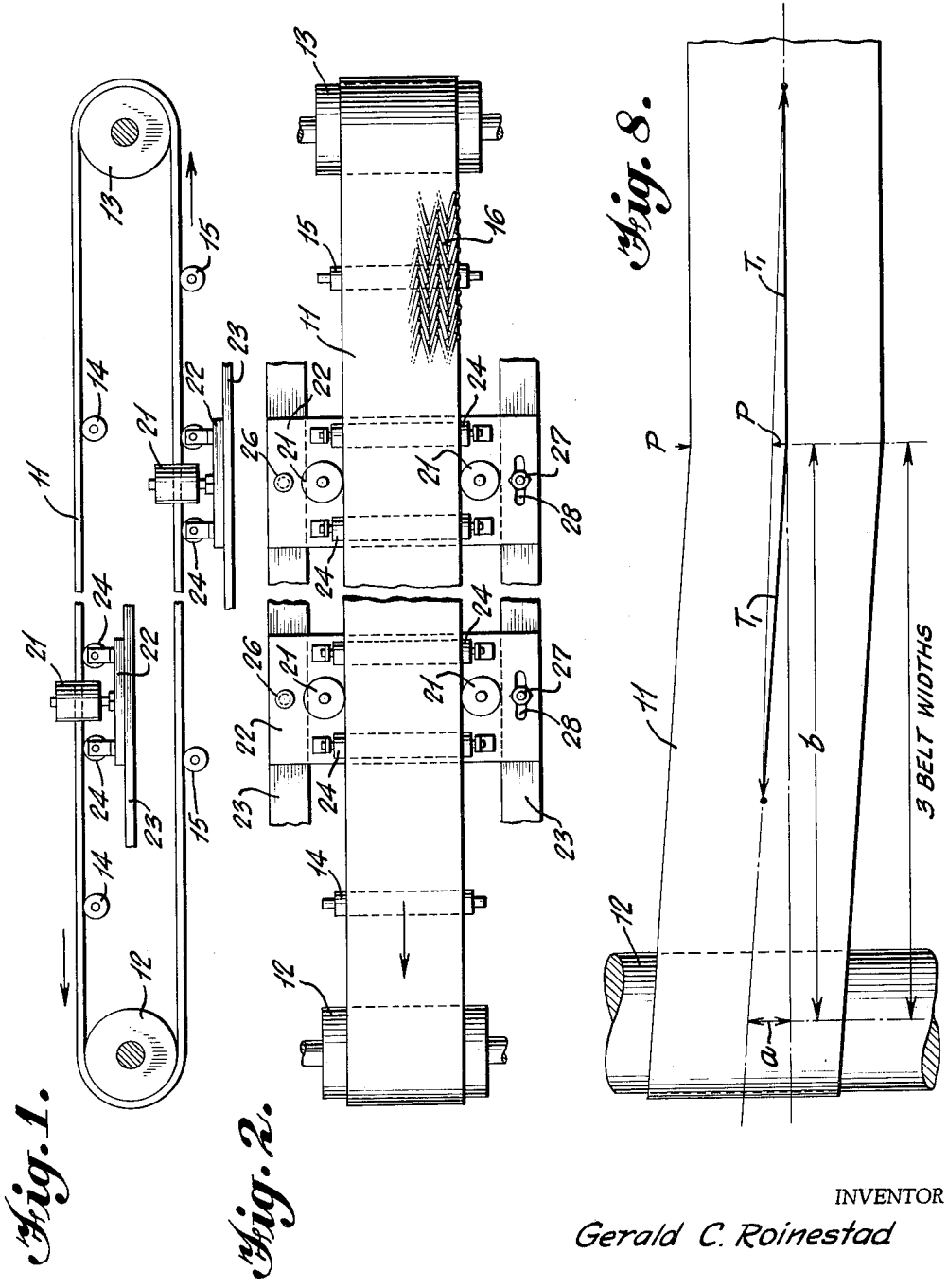
INVENTOR
Gerald C. Roinestad
BY
Irons, Birch, Swindler & McKie
ATTORNEYS Dec. 28, 1965  G. C. ROINESTAD  3,225,902
BELT CONTROL Filed Jan. 17, 1963  3 Sheets-Sheet 2

INVENTOR
Gerald C. Roinestad

BY Irons, Birch, Swindler & McKie
ATTORNEYS

Dec. 28, 1965  G. C. ROINESTAD  3,225,902
BELT CONTROL

Filed Jan. 17, 1963  3 Sheets-Sheet 3

INVENTOR
Gerald C. Roinestad

BY
ATTORNEYS 3,225,902
BELT CONTROL
Gerald C. Roinestad, Winchester, Va., assignor to Ashworth Bros., Inc., Fall River, Mass., a corporation of Massachusetts
Filed Jan. 17, 1963, Ser. No. 252,226
6 Claims. (Cl. 198—202)

This invention relates to endless conveyor belts and, more particularly, to the control of lateral movement or side travel of such belts.

A fundamental problem in operating conveyor belts, particularly flat, metal conveyor belts under heavy tension, is the control of side travel or lateral movement of the belt from its normal position with respect to the pulleys over which the belt travels. As a consequence, an endless variety of techniques and mechanisms have been proposed to the art in an attempt to overcome the problem of side travel. One rather obvious expedient which has been repeatedly attempted is the use of a pair of opposed guide rollers rigidly mounted on opposite sides of the belt to maintain it within acceptable lateral limits. The function of such rollers has been to engage the edges of the belt and thus physically block its side travel. Where the belt is under any substantial degree of tension, however, the side thrust which is developed as a result of lateral movement is very great. In resisting such thrust, the guide rollers inevitably cause a high degree of wear along the edges of the belt. Indeed, in many instances the guide rollers are destroyed by the powerful thrust of the belt. As a consequence, heretofore known side rollers functioning as belt guides generally have been rejected by the art, at least in conveyor installations of any size and any substantial belt tension.

Another basic technique which is in wide use involves the use of movable detection devices on opposite sides of the belt. Such devices do not function as stops but are moved outwardly by the belt to trigger the operation of an automatic realignment device which, through some expedient such as varying the angle of the pulley, causes a compensating realignment of the belt. In this type of system, when the belt moves in one lateral direction against one of the detection devices, the compensating correction in the pulley or the like reverses the direction of side travel. Such opposite movement continues until the belt moves the opposing detection device which results in another correction of the belt alignment, sending it once again in the original direction. As a result, the belt follows a constant movement from side to side which movement is generally termed "hunting." Such hunting is unavoidable in any automatic system of the type just described. Many expensive and complex arrangements have been evolved to eliminate hunting but without success. Hunting not only involves constant lateral movement of the belt, which itself is undesirable, but it gives rise to an additional difficulty. In any endless conveyor there is a condition known as waver which is a result of the original and unavoidable crookedness of the belt and the combined eccentricities of the conveying system. Constant hunting of a belt tends to increase waver with continued operation.

To overcome the disadvantages of the prior art, a general object of the present invention is to provide an improved method and apparatus for controlling lateral movement of conveyor belts.

A further object is to provide such a method and apparatus which is responsive to the lateral thrust of the belt at a location where such thrust is low but which enables effective control of side travel at the pulley where thrust is at a maximum.

Still another object of the invention is to provide such a method and apparatus which enables a relatively permanent correction to be made in the belt alignment thereby eliminating or minimizing hunting which inevitably results from constant correction.

Yet another object of the invention is to provide such a method and apparatus which decreases rather than increases the waver of the belt with continued operation.

In general, the invention relates to a method of controlling lateral movement of an endless conveyor belt traveling longitudinally around a pulley which method comprises positioning a plurality of supporting rollers extending laterally in engagement with the underside of the belt at locations spaced from said pulley and from each other, providing a pair of upright thrust detection rollers closely adjoining opposite edges of the belt and intersecting the plane thereof substantially at a location spaced from the pulley on the belt run approaching the pulley where the progressive decrease in potential lateral thrust of the belt relative to distance from the pulley begins a virtual plateau, said detection rollers being positioned between said pulley and at least one of said supporting rollers, each of said detection rollers being substantially fixed against outward lateral movement to resist thrust resulting from lateral movement of the belt, fixing the axis of said pulley substantially normal to the axis of said belt, detecting the magnitude of thrust exerted against the respective detection roller as said belt moves laterally, and varying the angle of said supporting rollers relative to the belt to correct the alignment of the belt when said thrust against the respective detection roller rises to a predetermined substantial magnitude while leaving the axis of said pulley fixed relative to the belt until the angle of approach of the belt to said detection rollers and said pulley is maintained so closely normal to the axis of the pulley that said thrust against said detection rollers remains below said predetermined magnitude for a substantial time without further adjustment of said supporting rollers.

In terms of apparatus, the invention relates generally to a belt control apparatus which comprises an endless conveyor belt, means to guide said belt in an endless path including a pulley around which said belt travels longitudinally, a pair of upright thrust detection roller means closely adjoining opposite edges of said belt and intersecting the plane thereof at a location spaced from said pulley on the belt run approaching the pulley where the progressive decrease in potential lateral thrust of the belt relative to distance from the pulley begins a virtual plateau, each of said roller means being substantially fixed against outward lateral movement to resist thrust resulting from lateral movement of the belt to enable manual detection of the magnitude of thrust exerted against the respective roller means as said belt moves laterally, and manually operated means to correct the alignment of the belt.

The invention having been generally described, several specific illustrative variations thereof will now be set forth in detail with reference to the accompanying drawings in which:

FIGURE 1 is a side view of an endless conveyor utilizing the invention;

FIGURE 2 is a top plan view of such conveyor;

FIGURE 8 is a plan view of one end of the conveyor belt showing a vector analysis utilized to determine the proper location of the detection rollers;

Figure 3:
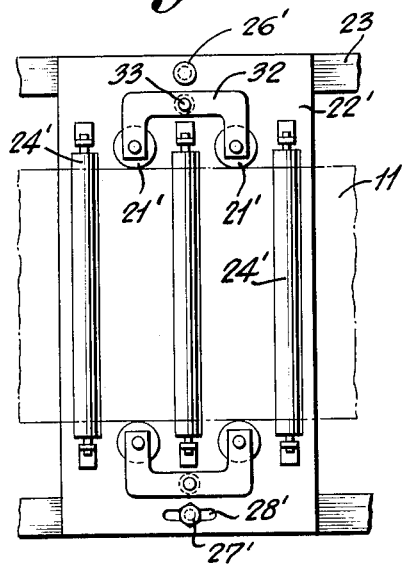
FIGURE 3 is a plan view of a modified form of an adjustable assembly of tandem detection rollers and lateral supporting rollers.

Depicted in FIGURES 1 and 2 is a conveyor system including an endless belt 11 which travels longitudinally around pulleys 12 and 13 in the usual manner. The belt supporting system includes a plurality of lateral supporting rollers 14 engaging the underside of the belt along its upper run and similar supporting rollers 15 which engage the underside of the lower run of the belt. The invention finds particular utility with respect to metallic conveyor belts, but is not limited to such belts. A typical fabric which is employed in metallic conveyor belts is shown in fragmentary form at 16 in FIGURE 2. It will be understood that any of a variety of metallic fabrics may be employed. Alternatively, the belt may consist of a continuous solid web.

Also shown in FIGURES 1 and 2 are two pairs of detection rollers 21. Each pair of such rollers is mounted on opposite sides of the conveyor belt 11 and intersecting the plane of the belt at a point spaced from an end pulley on the belt run approaching the pulley, as shown by the arrows in FIGURE 1. The purpose of the guide rollers is to control side travel or lateral movement of the belt. In accomplishing that purpose, the rollers 21 perform a dual function. As more fully described hereinafter, they detect excessive lateral thrust of the belt due to side travel and guide the belt when lateral thrust is within acceptable limits. The proper location of the guide rollers is important and the manner in which such location is determined will now be described.

Side travel may be defined as the continuous and cumulative lateral movement of the belt with respect to a single reference point, for example, the normal center line of the belt at one of the end pulleys. The magnitude of side travel may be expressed in terms of distance per cycle of belt operation. For present purposes, side travel will be considered without regard to the factor of waver which will be discussed hereinafter. The conveyor belt will be assumed to be a flat band operating within its elastic limit and the pulleys and supporting rollers will be assumed to be true cylinders rotating concentrically.

Ostensibly, if the axes of all of the pulleys and supporting rollers could be made precisely parallel and the axis of the conveyor could be precisely normal to the axes of the pulleys and supporting rollers, there would be no side travel. In practice, however, it is impossible to achieve a perfectly constructed and oriented system so that side travel is wholly eliminated. Thus, it logically can be assumed that the angle of approach of the conveyor axis to the axis of an end pulley is other than normal and the actual centerline of the belt at the end pulley is spaced from its normal centerline. The linear distance between the actual and normal center lines of the belt may be defined as the deviation. The conveyor belt will tend to travel in a lateral direction as to seek a normal angle of approach thus tending to decrease the deviation. It is important to note that there is no lateral slippage at the cylinder since the belt is being driven. It is also important to observe that side travel is a function of the angle of approach to the pulley and is not affected by any deviation of the angle of departure.

A significant force generated by the phenomenon of side travel is lateral thrust which may be defined as the force required either to impart or prevent lateral movement of the conveyor belt. The potential thrust at an end pulley can be calculated by the equation $$P = (T_1 + T_2)f$$

where:
$P$ = potential thrust;
$T_1$ = The tension on the conveyor belt as it approaches the pulley;
$T_2$ = The tension on the conveyor belt as it leaves the pulley; and
$f$ = The coefficient of friction between conveyor belt and pulley.

In order to evaluate thrust potential along the approach of the conveyor belt to the pulley, it was necessary to determine the distance from the cylinder where the bending resistance of the belt was small as compared to the thrust and could be ignored. Through repeated experimentation, it was found that such distance was a function of the width of the belt and for reasonable belt tensions, an evaluation of thrust potential at a point three belt widths from the axis of the pulley would reflect essentially a pure thrust. The choice of the three-belt width distance is based on the selection of an integer closest to an average of a wide variety of typical situations. It must be appreciated, however, that the figure of three belt widths is approximate and generally applicable but not necessarily ideal in any given situation. In evaluating potential thrust at the reference point three belt widths from the pulley axis, it is necessary to assume that the conveyor belt deviates from the normal center line only between the reference point and the cylinder. This is a reasonable assumption since the resultant thrust under this condition would exceed that normally encountered. A schematic representation of a conveyor belt having such a deviation at a reference point three belt widths from a pulley appears in FIGURE 8. Thus, at the reference point, the potential thrust P is equal to the resultant of the tension in a direction along the normal belt axis and the tension along the axis of the deviated portion of the belt as graphically shown in FIGURE 8. These tensions can be assumed to be equal because of the small angle of deviation. Side travel of the belt can be prevented by the application of an equal and opposing force P at the reference point. The potential thrust can be calculated according to the equation $$\frac{P}{T_1} = \frac{a}{b}$$

$$P = T_1 \frac{a}{b}$$

where:
$a$ = the deviation at the pulley axis;
$b$ = the distance from the pulley axis to the reference point.

To equate the general theory thus far developed to a metal conveyor belt, a typical conveyor will be assumed which is subject to the following conditions:

$T_1 = 2000$ lbs.
$T_2 = 500$ lbs.
Belt width = 36 inches

Thus $b = 108$ inches
$a = 1$ inch
Coefficient of friction = 0.3

The assumption of a 1-inch maximum deviation is actually well in excess of that which would be created under the most severe cases of eccentric loading or heating across the width of the belt. This has proved valid regardless of belt width, conveyor length or belt tension so long as the elastic limit of the belt is not exceeded. Therefore, under these conditions:

(1)   $P$(at end pulley $(T_1 + T_2)f = (2000 + 500)0.3$

Thus, $P = 750$ lbs. at the end pulley.

(2) $\quad P \text{ (at reference point)} = T_1 \frac{a}{b} = 2000 \frac{1}{108}$ Thus, $P=18.5$ lbs. at three belt widths distance from the pulley.

Figure 9:
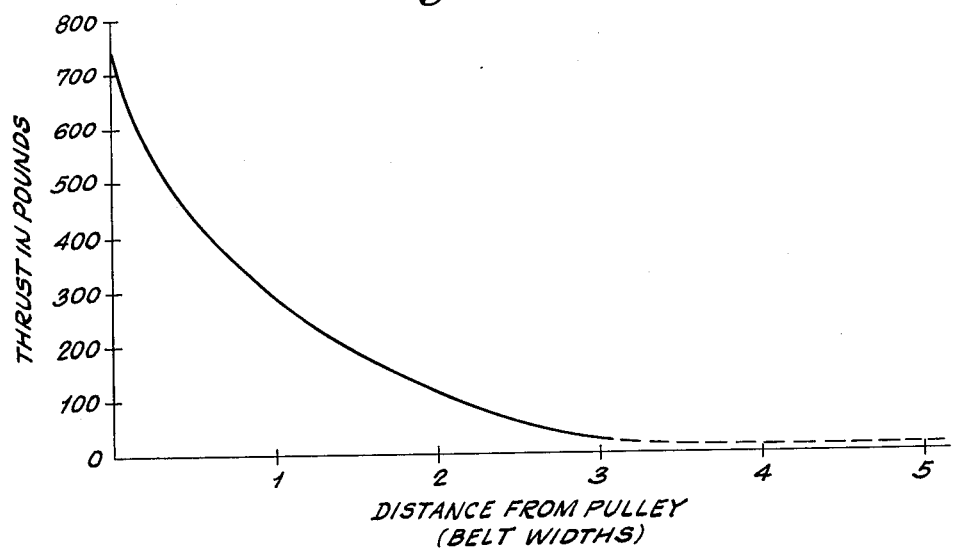
FIGURE 9 is a graph illustrating the decrease in lateral thrust of the belt with distance away from the pulley.

The foregoing calculations demonstrate the drastic drop in potential thrust of the belt at a distance of three belt widths from the pulley. The progressive decrease in potential thrust with distance away from the pulley is illustrated by the graph in FIGURE 9 which includes the two points determined by the foregoing computations. It can be seen from such graph that at approximately three belt widths from the pulley, the progressive decrease in potential thrust with distance away from the pulley reaches a virtual plateau in its asymptotic approach to zero. Depending upon a variety of conditions, the beginning of the plateau in terms of belt widths from the pulley will vary. As an average, however, the plateau begins at approximately three belt widths.

Vertical belt guides, such as the rollers 21, should be positioned at a point of low belt thrust. Much experimentation and numerous field installations have established that such vertical belt guides can be most advantageously positioned at substantially the beginning of the virtual plateau in the decrease in thrust potential with distance from the pulley. Excellent results can be achieved with most systems if the rollers are located approximately three belt widths from the pulley. A practical operating range for most systems would be between about two and about four belt widths. It will be appreciated, however, that in given situations not only will the ideal distance vary but the practical operating range will vary up or down. If the guide rollers are too close to the pulley, the thrust will be too great. If they are too far from the pulley, the effectiveness of the control at the pulley will suffer. In short systems, less than six belt widths long, the tensions in the belt are usually low and adequate results usually are obtained by positioning the rollers at the midpoint of the run having the least tension. The thrusts usually are no greater than those encountered in longer systems.

Even if the vertical guides are ideally located, their use would be wholly impractical if there were not a careful limitation of the maximum thrust to which the guides will be subjected. Excessive thrust results in severe damage to the belt edges and to the guides themselves. The present invention enables a determination of thrust to be made at the guide rollers and a correction of a relatively permanent nature can be incorporated into the system to prevent excessive thrust from ever being exerted on the guides.

Figure 10:
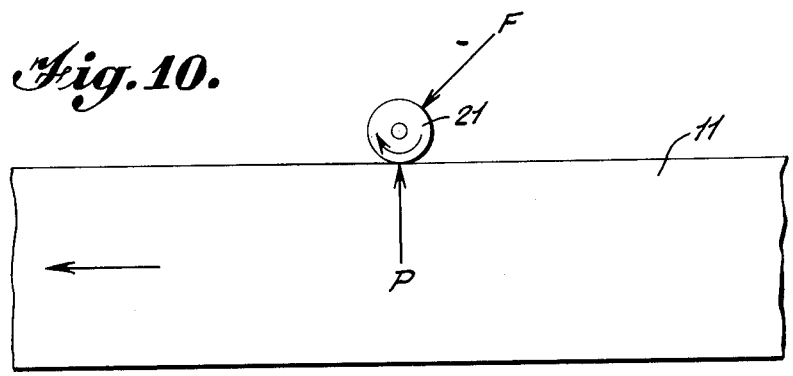
FIGURE 10 is a schematic illustration of the cooperation between a detection roller and the belt.

If a vertical guide and detection roller is mounted along the edge of the belt, it will absorb the thrust of the belt and at the same time rotate from the further movement of the belt as illustrated in FIGURE 10. The normal braking force, shown by the arrow and designated F in FIGURE 10, required to stop the rotation of the roller will be approximately equal to the thrust of the belt assuming that the coefficients of friction between the belt and the roller and between the brake and the roller are approximately equal. It is, therefore, possible to detect approximate lateral belt thrust by measuring the normal force required to stop a vertical roller which is being turned by contact with a moving belt. When the force is excessive, the belt can be realigned until the thrust is again below the desired maximum. Finger pressure of the operator can effectively be employed as a brake. Alternatively, a mechanical brake and indicator of any conventional type may be employed.

The important consideration is that a detection device be employed which will detect a thrust of a particular substantial magnitude which nevertheless is safely below the maximum thrust which could be incurred without damaging the edges of the belt. When that substantial magnitude is reached, the belt should be realigned to reduce the thrust to a lower level.

Thus, where the guide rollers are properly positioned as described they perform a dual function. First, the rollers can be used to detect when the magnitude of thrust is excessive. Secondly, the rollers will effect a positive guidance with a minimum of frictional wear to the belt edge so long as the lateral thrust is within acceptable limits.

The vertical thrust detection and guiding rollers 21 at each end of the conveyor belt 11, illustrated in FIGURES 1 and 2, are located approximately three belt widths from the center lines of their respective pulleys 12 and 13. In each case the rollers 21 are located on the approach run of the belt.

The guiding and detecting rollers should be positioned closely adjoining the edges of the belt. Generally a clearance of about one-eighth to one-quarter of an inch is sufficient, although it might vary from that range. There should be some provision on the assembly frame for lateral adjustability of the guide roller mounts. This will allow for adjustment of the clearance between the rollers and the belt and for adjustment of the centerline of the belt.

Preferably, the detection rollers 21 are mounted on a horizontal platform 22 which is supported by a frame 23 only a portion of which is shown. Also mounted on the platform 22 are a pair of horizontal supporting rollers 24. Normally, the axis of each of the rollers 24 is perpendicular to the axis of the conveyor belt. Provision is made, however, for angular adjustment of the platform 22 which consequently effects angular adjustment of the axis of the supporting rollers 24 relative to the axis of the belt 11. As shown in FIGURE 2, one side of the platform 22 is pivoted at a pinned connection 26. The other side of the platform is connected to the frame by a pin 27 extending through a slot 28 in the platform. Thus, the slotted end of the platform may be moved longitudinally of the belt to vary the angular relationship of the axes of the supporting rollers and the belt to counteract side travel of the belt.

The conveyor system shown in FIGURES 1 and 2, utilizing two end pulleys, is typical and in such a system two sets of guide rollers are employed on the approach run of the belt to each end pulley. Thus, the guide rollers will control side travel at each pulley. When the end pulleys are characterized by reasonable accuracy in construction and orientation, side travel for the whole conveyor will be adequately controlled.

Frequently a system of several end pulleys is used instead of a single end pulley. For example, take-up pulleys may be situated adjacent the usual end pulley. It has been found that control of side travel at the approach to the first pulley in the system establishes that pulley as a virtual guide for the next pulley and in turn each pulley becomes a virtual guide for its succeeding pulley.

In some cases, the conveyor belt passes around one or more pulleys located intermediate the end pulleys and spaced a substantial distance from each. In these cases, it may be necessary to provide a set of guide rollers at the approach to the intermediate pulley.

It has been found particularly advantageous in certain systems to employ tandem detection rollers. One embodiment of such tandem rollers is shown in FIGURE 3. This embodiment employs an assembly of guide rollers 21' and supporting rollers 24' generally similar to those shown in FIGURE 2. A platform 22' having a fixed pivot 26' to one side of the frame 23 and a pin 27' and slot 28' connection to the other side of the frame is employed. In this particular embodiment three supporting rollers 24' are employed instead of the two which are shown in the arrangement of FIGURE 2. It will be understood that more or fewer supporting rollers can be used. Instead of the single detection roller, however, a pair of detection rollers 21' are positioned in engagement with the edge of the belt and connected together in tandem by means of a U-shaped member 32 pivotally connected at 33 to the platform 22'.

Figure 5:
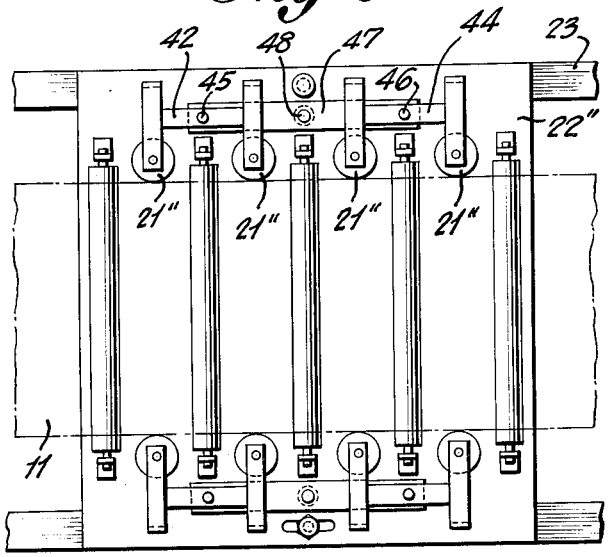
FIGURE 5 is a further modified form of such an assembly.
Figure 4:
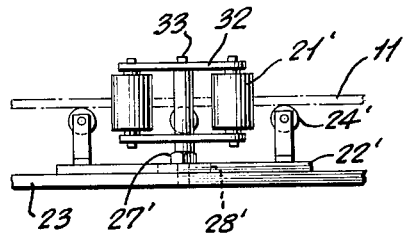
FIGURE 4 is an end view of the assembly of FIGURE 3.
Figure 6:
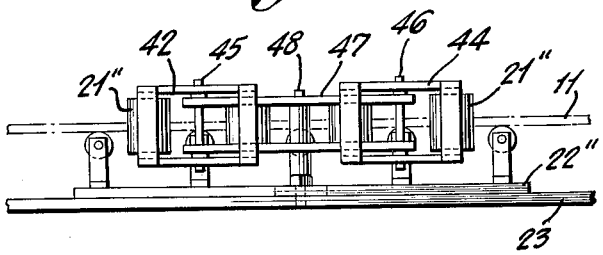
FIGURE 6 is an end view of the assembly of FIGURE 5.

The concept of tandem rollers may be carried still further to employ a plurality of tandem pairs of tandem rollers, as illustrated in FIGURE 5. In this arrangement, a platform 22" is employed which is adjustably mounted in the same manner previously described. A first pair of tandem rollers 21" are connected together by a U-shaped member 42. A second pair of tandem rollers 21" are connected together by a U-shaped member 44. Each of the members 42 and 44 is pivoted at the center of its base portion to the outer ends of a link 47 by pins 45 and 46, respectively. The link 47 is in turn pivoted by pin 48 to the platform 22" at a point midway between the pivots 45 and 46.

Figure 7:
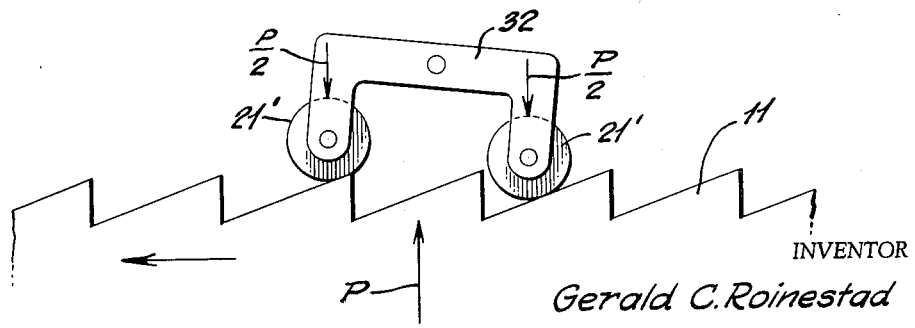
FIGURE 7 is a schematic illustration of the action of tandem detection rollers against the irregular edge of a conveyor belt.

By virtue of the tandem connections, the lateral thrust is equally divided between all of the rollers on one side of the belt. The action of a pair of tandem rollers with respect to a belt having an irregular edge is shown in FIGURE 7. Where tandem rollers are employed, it is desirable to locate the roller nearest the pulley at the beginning of the plateau in the decrease of the potential thrust with distance away from the pulley. Thus, the previously discussed spacing of the guide roller with respect to the pulley, in the case of tandem rollers, applies to the roller nearest the pulley. Accordingly, it is usually satisfactory to mount the first of the tandem rollers at a point about three belt widths from the axis of the end pulley.

Tandem rollers are advantageous for several reasons. First, the thrust of a single roller may be in excess of the safe lateral strength of the belt. Secondly, where the belt edge is irregular, which it frequently is as typified by the edge of the fabric 16 shown in FIGURE 2, tandem rollers permit lateral movement of individual rollers but not of the tandem connection. This characteristic is illustrated in FIGURE 7.

The diameter of the guide rollers and the longitudinal spacing between tandem rollers may vary widely depending upon the characteristics of the particular conveyor system involved.

For most belts, the guide rollers may have a mild steel face. Where corrosion or abrasion might be a problem, the roller faces could be brass, stainless steel, or a suitable non-metallic material. Usually roller or ball bearings are provided for the guide rollers, but where speeds are low and/or operation occurs at a high temperature, sleeve bearings could be employed.

Since reactive thrusts are low at the location of the guide rollers and the belt edge cannot be subjected to high thrust forces, the guide roller assembly need not be unduly heavy. Indeed, there is an advantage in light rollers and tandem couplings because of their low inertia. Heavy rollers might not rotate when subjected to low thrust.

The initial orientation and operation of a typical installation according to the invention will now be described. Initially, the conveyor system is carefully aligned as closely as possible by conventional practice. For example, a transit and a cross may be employed to position the conveyor as closely perpendicular as possible to the end pulleys and supporting rollers. The guide rollers are then positioned with reference to the center line of the conveyor allowing slight clearances. The axis of the guide roller assembly is adjusted to a position as nearly perpendicular as possible to the belt axis. The belt is then set in motion.

Depending on the accuracy of the alignment and the trueness of the belt, it will either bear continuously against one side or the other of the guide rollers or will intermittently contact the guide rollers on one side and then on the other. If the first condition occurs, the platform 22 should be moved to adjust the support rollers to re- align the belt and cause it to intermittently contact the guide rollers on each side. When the latter condition is achieved, a determination of thrust can be made. One of the guide rollers on each side of the belt may be grasped between the fingers and opposed thumb of the operator who applies maximum finger pressure. Such maximum pressure will be approximately ten pounds reactive thrust and for normal operators will not vary substantially from that amount regardless of his physical stature. If the roll can be stopped or prevented from turning when contacted by the belt edge, the reactive thrust of that belt edge can be assumed to be within acceptable limits for a majority of belt specifications. Where tandem rollers are employed, the determination may be made for only one roller of each tandem type guide but must be made on both sides of the belt. If the thrust is too great on both sides at one location, the guide rollers should be spread apart to provide more clearance. If the thrust is too great on one side only, the assembly should be adjusted by moving the pin 27 in the slot 28 in a direction to compensate for the side travel which is causing the excessive thrust. Accordingly, the guide rollers never are required to bear the full potential thrust of the belt. The maximum allowable thrust could be varied in particular situations but the finger pressure test is adequate for the great majority of conveyor systems with the result that no substantial wear of the edges of the belt occurs and excellent control is effected.

Desirably, where the belt is operating properly without excessive thrust in either direction, the pin 27 is roughly centered in the slot 28. If the pin is substantially off center, an adjustment in the connection to the frame should be made to bring the pin roughly to a centered condition.

While it is definitely preferred to effect realignment of the belt by adjusting the support rollers as described, it is feasible in certain conditions to adjust the belt alignment by any other technique. It might even be acceptable to vary the position of the end pulley. However, the latter adjustment is usually undesirable.

The determination of reactive thrust is made periodically as the conveyor operates to provide a maintenance check and compensating adjustments should be made as required. Where the guide rollers are positioned in accordance with the present invention, it has been found that the belt will operate properly without adjustment for long periods of time.

Among the advantages of lengthy operation without frequent adjustment is the progressive diminution of waver of the belt. Waver results either from crookedness of the belt or from the sum of the eccentricities of the conveying system. Waver resulting from crookedness of the belt is termed static waver. Waver resulting from the integrated eccentricities of the system is called dynamic waver. Usually dynamic waver is minor compared to static waver. Static waver duplicates itself each cycle; whereas dynamic waver is seldom a function of belt length and is random in nature. With static waver, there is no lateral movement from cycle to cycle with respect to any reference point on the belt passing a reference point on the pulley. With dynamic waver, there may be lateral movement of such reference points but in both directions with the cumulative average being zero. In contrast to both, side travel results in a cumulative and continuous lateral movement.

Considerable field experimentation with the present invention indicates that static waver tends to diminish with the passage of time. The exact reason for such elimination of static waver is not certain but it is likely that the continuous peening effect of the rollers on the edges of the belt reseats the belt elements in a more desirable alignment not possible to obtain with even the most exacting manufacturing techniques. The opposite effect occurs when there is continuous realignment of the belt by some of the heretofore known automatic systems. Static waver increases with usage in such systems.

With the diminution of static waver over a period of time, it is desirable to decrease the clearance between guide roller faces on opposite sides of the belt. Where waver of the belt causes excessive thrust, such thrust can be reduced to safe levels by increasing the clearances between the guide rollers. Regardless of waver, however, the belt continues to operate normally in a properly aligned system. Waver requires only adjustment of clearances, not realignment of the belt.

There have been illustrated and described several embodiments of the invention which are illustrative only. Many modifications may be made by persons skilled in the art without departing from the scope of the invention which scope is determined solely by the appended claims.

What is claimed is:

1. A method of controlling lateral movement of an endless conveyor belt traveling longitudinally around a pulley which method comprises positioning a plurality of supporting rollers extending laterally in engagement with the underside of the belt at locations spaced from said pulley and from each other, providing a pair of upright thrust detection rollers closely adjoining opposite edges of the belt and intersecting the plane thereof substantially at a location spaced from the pulley on the belt run approaching the pulley where the progressive decrease in potential lateral thrust of the belt relative to distance from the pulley begins a virtual plateau, said detection rollers being positioned between said pulley and at least one of said supporting rollers, each of said detection rollers being substantially fixed against outward lateral movement to resist thrust resulting from lateral movement of the belt fixing the axis of said pulley substantially normal to the axis of said belt, detecting the magnitude of thrust exerted against the respective detection roller as said belt moves laterally, and varying the angle of said supporting rollers relative to the belt to correct the alignment of the belt when said thrust against the respective detection roller rises to a predetermined substantial magnitude while leaving the axis of said pulley fixed relative to the belt until the angle of approach of the belt to said detection rollers and said pulley is maintained so closely normal to the axis of the pulley that said thrust against said detection rollers remains below said predetermined magnitude for a substantial time without further adjustment of said supporting rollers.

2. The method according to claim 1 wherein said detection rollers are located between about two and about four belt widths from the pulley.

3. The method according to claim 1 wherein said detection rollers are located approximately three belt widths from the pulley.

4. The method according to claim 1 wherein at least one of said supporting rollers is in the vicinity of said detecting rollers.

5. The method according to claim 1 wherein said detecting is accomplished by applying a braking force to the respective roller to which the belt applies a thrust as said belt moves laterally.

6. The method according to claim 5 wherein said braking force is applied manually by finger pressure and said correction is effected when maximum finger pressure is insufficient to stop rotation of the respective roller.

References Cited by the Examiner
UNITED STATES PATENTS

| | | | |
|---|---|---|---|
| 795,269 | 7/1905 | Clay | 198—202 X |
| 1,088,644 | 2/1914 | Willson | 198—192 |
| 1,252,497 | 1/1918 | Royce | 198—202 X |
| 1,545,309 | 7/1925 | Davis | 198—202 X |
| 1,821,664 | 9/1931 | Peiler | 198—202 X |
| 2,725,757 | 12/1955 | Murphy | 198—202 X |

SAMUEL F. COLEMAN, *Primary Examiner.*

EDWARD A. SROKA, *Examiner.*